(12) United States Patent
Kofford et al.

(10) Patent No.: US 10,113,897 B2
(45) Date of Patent: Oct. 30, 2018

(54) APPARATUS FOR CATCHING OIL DRIPS ASSOCIATED WITH USE OF AN OIL LEVEL GAUGE TOOL

(71) Applicants: Richard Kofford, Myton, UT (US); Christa Pike-Kofford, Myton, UT (US)

(72) Inventors: Richard Kofford, Myton, UT (US); Christa Pike-Kofford, Myton, UT (US)

( * ) Notice: Subject to any disclaimer, the term of this patent is extended or adjusted under 35 U.S.C. 154(b) by 82 days.

(21) Appl. No.: 14/816,150

(22) Filed: Aug. 3, 2015

(65) Prior Publication Data

US 2017/0038239 A1 Feb. 9, 2017

(51) Int. Cl.
*G01B 3/00* (2006.01)
*G01F 23/04* (2006.01)

(52) U.S. Cl.
CPC ..................... *G01F 23/04* (2013.01)

(58) Field of Classification Search
CPC ....................................................... G01F 23/04
USPC .................. 33/722, 725, 726, 391, 392, 730
See application file for complete search history.

(56) References Cited

U.S. PATENT DOCUMENTS

| | | | |
|---|---|---|---|
| 457,458 A | 8/1891 | Britton | |
| 1,703,703 A | 2/1929 | Anderson | |
| 2,061,094 A | 8/1932 | Thomas | |
| 2,040,975 A | 5/1935 | Cain | |
| 2,201,517 A | 10/1938 | Bow | |
| 2,157,024 A | 5/1939 | Smith | |
| 2,354,853 A * | 8/1944 | Dobbs | F21L 15/08 33/348 |
| 2,440,571 A | 4/1948 | Bow | |
| 2,504,563 A | 4/1950 | Menke | |
| 2,762,075 A | 9/1956 | Bratton | |
| 2,779,045 A | 1/1957 | Harvey | |
| 2,906,471 A | 9/1959 | Huff | |
| 3,112,729 A | 12/1963 | Prezioso, Jr. | |
| 3,594,906 A * | 7/1971 | Kerfoot | G01F 23/04 33/717 |

(Continued)

FOREIGN PATENT DOCUMENTS

RU 2423675 C1 7/2011

OTHER PUBLICATIONS

Goggle Search Result #1—Website Link: <Feb. 5, 2015>: http://www.southwesttoolandsupply.com/catalogItems/view/shop-online/gaugers-tray.

(Continued)

*Primary Examiner* — G. Bradley Bennett
(74) *Attorney, Agent, or Firm* — Russ Weinzimmer & Associates, PC

(57) ABSTRACT

An apparatus is disclosed for catching and accumulating oil drips associated with use of an oil level gauge tool so as to avoid contaminating the environment with oil while using the tool. The apparatus includes: a handle receiving portion capable of receiving and securing the handle of the tool; a plumb bob receiving portion capable of receiving the plumb bob of the tool, also capable of catching and accumulating oil drips from the tool; and a tape reel receiving portion capable of receiving the tape reel tool, also capable of catching oil drips from the oil level gauge tool. The apparatus can have a hanger arm, attached to the tape reel receiving portion, the hanger arm being capable of attaching to a structure so as to support the apparatus. The apparatus can also have a base capable of resting on a surface so as to support and stabilize the apparatus.

20 Claims, 9 Drawing Sheets

(56) References Cited

U.S. PATENT DOCUMENTS

| | | | | |
|---|---|---|---|---|
| 4,942,669 | A | * | 7/1990 | Schnedl ................ G01F 23/045 33/725 |
| 5,241,753 | A | * | 9/1993 | Lalevee, Sr. ............ G01F 23/04 33/722 |
| 5,375,862 | A | | 12/1994 | Sirianno |
| 6,898,861 | B2 | | 5/2005 | Bartimus |
| 7,090,054 | B2 | | 8/2006 | Iwamasa et al. |
| 7,513,392 | B2 | | 4/2009 | Fowler et al. |
| 7,730,573 | B1 | | 6/2010 | Snyder |
| 2002/0124694 | A1 | | 9/2002 | Vandiver |
| 2008/0216858 | A1 | * | 9/2008 | Goldstein ............. G01F 23/045 132/218 |
| 2011/0247230 | A1 | * | 10/2011 | Goldstein ............... G01F 23/04 33/725 |
| 2013/0305552 | A1 | * | 11/2013 | Krishnamurthy ....... G01F 23/04 33/728 |
| 2013/0326835 | A1 | | 12/2013 | Hunskor et al. |

OTHER PUBLICATIONS

Google Search Result #2—Website Link: <Feb. 5, 2015>: http://www.amazon.com/Solutions-Drip-Catcher-Polypropylene-Accessory/dp/B00K8GUJQ/ref=sr_1_9?s=kitchen-bathe&ie=UTF8&qid=1423185378&sr=1-9 TVK.

* cited by examiner

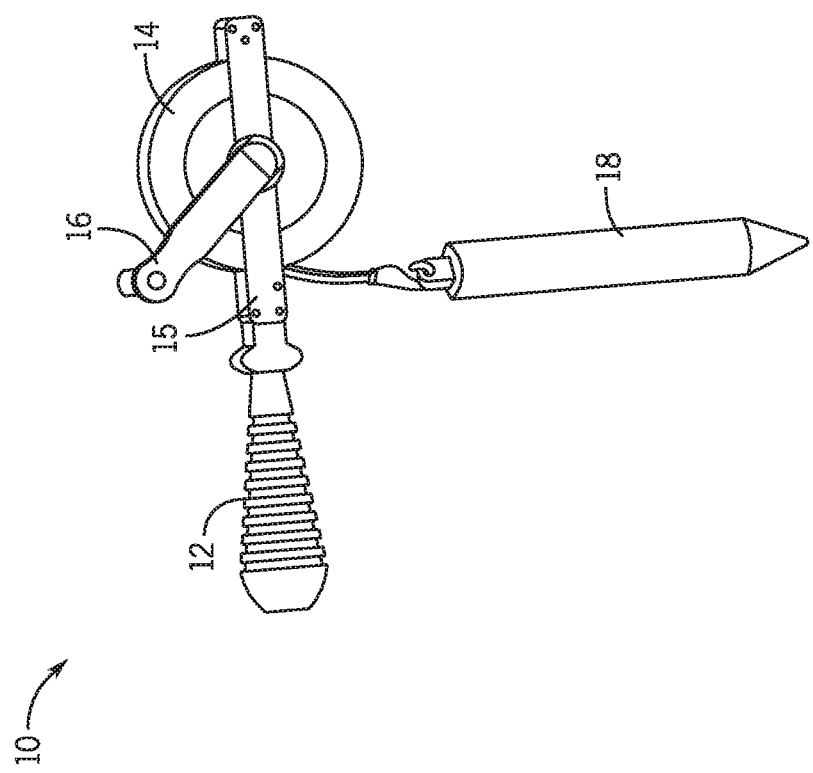

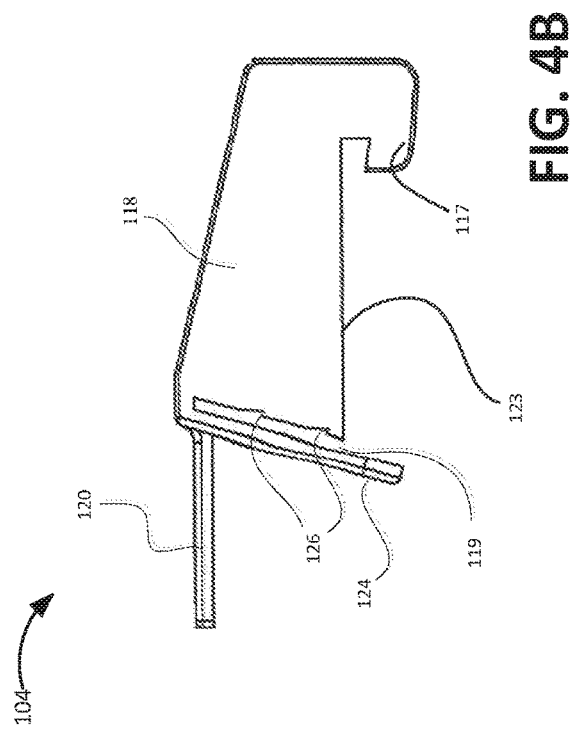
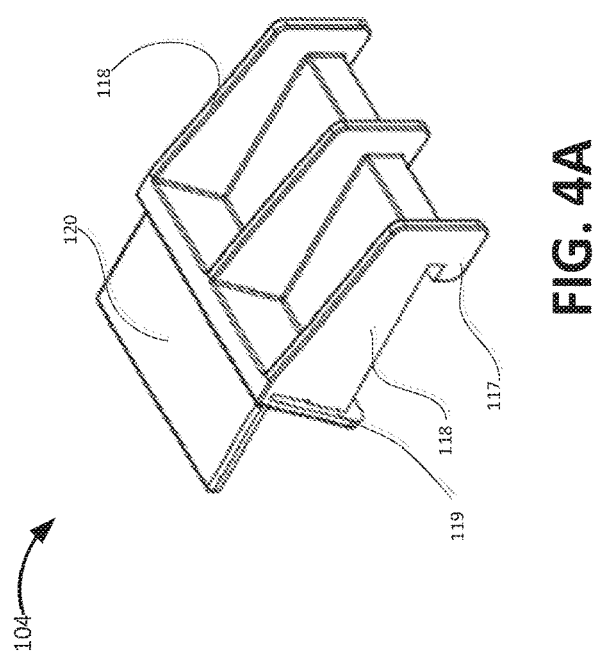
FIG. 4A
FIG. 4B

APPARATUS FOR CATCHING OIL DRIPS ASSOCIATED WITH USE OF AN OIL LEVEL GAUGE TOOL

FIELD OF THE INVENTION

This invention generally relates to oil level gauge tools, and to protecting the environment when using oil level gauge tools.

BACKGROUND

Gauge tools are often used to manually gauge oil levels in an oil tank. An example gauge tool 10 is shown in FIG. 1. The gauge tool 10 has a handle 12, a tape reel 14, a tape reel support 15 attached to the handle 12, a tape reel handle 16 for winding tape onto the tape reel 14, and a plumb bob 18 attached to the tape of tape reel 14. To gauge the oil level in an oil tank, an operator can grip the handle 12, place the plumb bob 18 in an opening of the oil tank, and turn the reel handle 16 to unwind the tape reel 14 and lower the plumb bob 18 into the tank until the plumb bob 18 has been dipped into the oil. The user then winds up the tape to the tape reel 14 by turning the tape reel handle 16 to raise the plumb bob 18 out of the oil tank.

Since the plumb bob 18 has been dipped in the oil, the oil runs off from the plumb bob 18 when the plumb bob 18 is removed from the oil tank. When the gauge tool 10 is carried away by a worker after use, the oil drips off of the plumb bob 18, the tape reel 14, and potentially off of other parts of the gauge tool 10. The oil can drip around a work area from which the gauge tool 10 was used. For example, the oil can drip on to a surface of the oil tank, or onto floors/ramps around or leading up to the work area. Also, the oil can drip onto railings, angle irons, stairs, and ladders around or leading up to the work area. This causes a safety hazard, as workers can slip on the dripped oil. Moreover, spilled oil is hazardous to the environment, and can be costly to clean up. Also, cleaning oil drips can be very difficult, time consuming, and potentially hazardous to the health of the individuals responsible for cleaning the oil drips.

SUMMARY

A general aspect of the invention is an apparatus for catching and accumulating oil drips associated with use of an oil level gauge tool, the oil level gauge tool having a handle, a tape, a tape reel having a winding handle for winding the tape onto the tape reel, a tape frame for supporting the tape reel, and a plumb bob attached at an end of the tape. The apparatus includes: a handle receiving portion capable of receiving and securing the handle of the oil level gauge tool; a plumb bob receiving portion capable of receiving the plumb bob, also capable of catching and accumulating oil drips from the oil level gauge tool; and a tape reel receiving portion capable of receiving the tape reel, also capable of catching oil drips from the oil level gauge tool.

In some embodiments, the apparatus also includes a hanger arm, attached to the tape reel receiving portion, the hanger arm being capable of attaching to a structure so as to support the apparatus. In further embodiments, the hanger arm includes a slot, and is attached to the tape reel receiving portion via the slot. In other further embodiments, the hanger arm is configured so as to attach to an angle iron.

In some embodiments, the apparatus also includes a base, attached to the plumb bob receiving portion, the base being capable of resting on a surface so as to stabilize the apparatus.

In some embodiments, the plumb bob receiving portion and the tape reel receiving portion are in fluid communication, such that oil collected in the tape reel receiving portion can flow to and be collected in the plumb bob receiving portion.

In some embodiments, the handle receiving portion is in fluid communication with the plumb bob receiving portion, such that oil collected in the plumb bob receiving portion can controllably flow out from the apparatus when there is not a handle in the handle receiving portion, and the apparatus is tilted.

In some embodiments, the base is sized and shaped so as to be broader than the bottom of the plumb bob receiving portion, and to extend under the tape reel receiving portion.

Another general aspect of the invention is an apparatus for catching and accumulating oil drips associated with use of an oil level gauge tool, the oil level gauge tool having a handle, a tape, a tape reel having a winding handle for winding the tape onto the tape reel, a tape frame for supporting the tape reel, and a plumb bob attached at an end of the tape. This apparatus includes; a handle receiving portion capable of receiving and securing the handle of the oil level gauge tool; a plumb bob receiving portion capable of receiving the plumb bob, also capable of catching and accumulating oil drips from the oil level gauge tool; a tape reel receiving portion capable of receiving the tape reel, also capable of catching oil drips from the oil level gauge tool; a hanger arm, extending from the tape reel receiving portion, the hanger arm being capable of attaching to a structure so as to support the apparatus; and a base, integral with the bottom of the plumb bob receiving portion, the base being capable of resting on a surface so as to support the apparatus.

In some embodiments, the plumb bob receiving portion and the tape reel receiving portion are in fluid communication, such that oil collected in the tape reel receiving portion can flow to and be collected in the plumb bob receiving portion.

In some embodiments, the handle receiving portion is in fluid communication with the plumb bob receiving portion, such that oil collected in the plumb bob receiving portion can controllably flow out from the apparatus when there is not a handle in the handle receiving portion, and the apparatus is tilted.

In some embodiments, the hanger arm is configured so as to attach to an angle iron.

In some embodiments, the base is sized and shaped so as to be broader than the bottom of the plumb bob receiving portion, and to extend under the tape reel receiving portion.

Another general aspect of the invention is an apparatus for catching and accumulating oil drips associated with use of an oil level gauge tool, the oil level gauge tool having a handle, a tape, a tape reel having a winding handle for winding the tape onto the tape reel, a tape frame for supporting the tape reel, and a plumb bob attached at an end of the tape. This apparatus includes: a handle receiving portion capable of receiving and securing the handle of the oil level gauge tool; a plumb bob receiving portion capable of receiving the plumb bob, also capable of catching and accumulating oil drips from the oil level gauge tool; and a tape reel receiving portion capable of receiving the tape reel, also capable of catching oil drips from the oil level gauge tool, wherein the plumb bob receiving portion and the tape reel receiving portion are in fluid communication, such that oil collected in the tape reel receiving portion can flow to and be collected in the plumb bob receiving portion, and wherein the handle receiving portion is in fluid communication with the plumb bob receiving portion, such that oil collected in the plumb bob receiving portion can controllably flow out from the apparatus when there is not a handle in the handle receiving portion, and the apparatus is tilted.

In some embodiments, the apparatus also includes: a hanger arm, attached to the tape reel receiving portion, the hanger arm being capable of attaching to a structure so as to support the apparatus. In further embodiments, the hanger arm includes a slot, and is attached to the tape reel receiving portion via the slot. In other further embodiments, the hanger arm is configured so as to attach to an angle iron.

In some embodiments, the apparatus also includes a base, attached to the plumb bob receiving portion, the base being capable of resting on a surface so as to support the apparatus. In further embodiments, the base is sized and shaped so as to be broader than the bottom of the plumb bob receiving portion, and to extend under the tape reel receiving portion. In further embodiments, the base is removable.

BRIEF DESCRIPTION OF THE DRAWINGS

For a fuller understanding of the invention, reference is made to the following detailed description, taken in connection with the accompanying drawings in which:

FIG. 1 is side view of a prior art gauge too that typically drips oil after use, causing environmental damage;

FIG. 4A is a perspective view of a hanger arm of the oil catch bucket of FIG. 2A;

FIG. 4B is a side view of a hanger arm of the oil catch bucket of FIG. 2A;

DETAILED DESCRIPTION

Figure 2A:
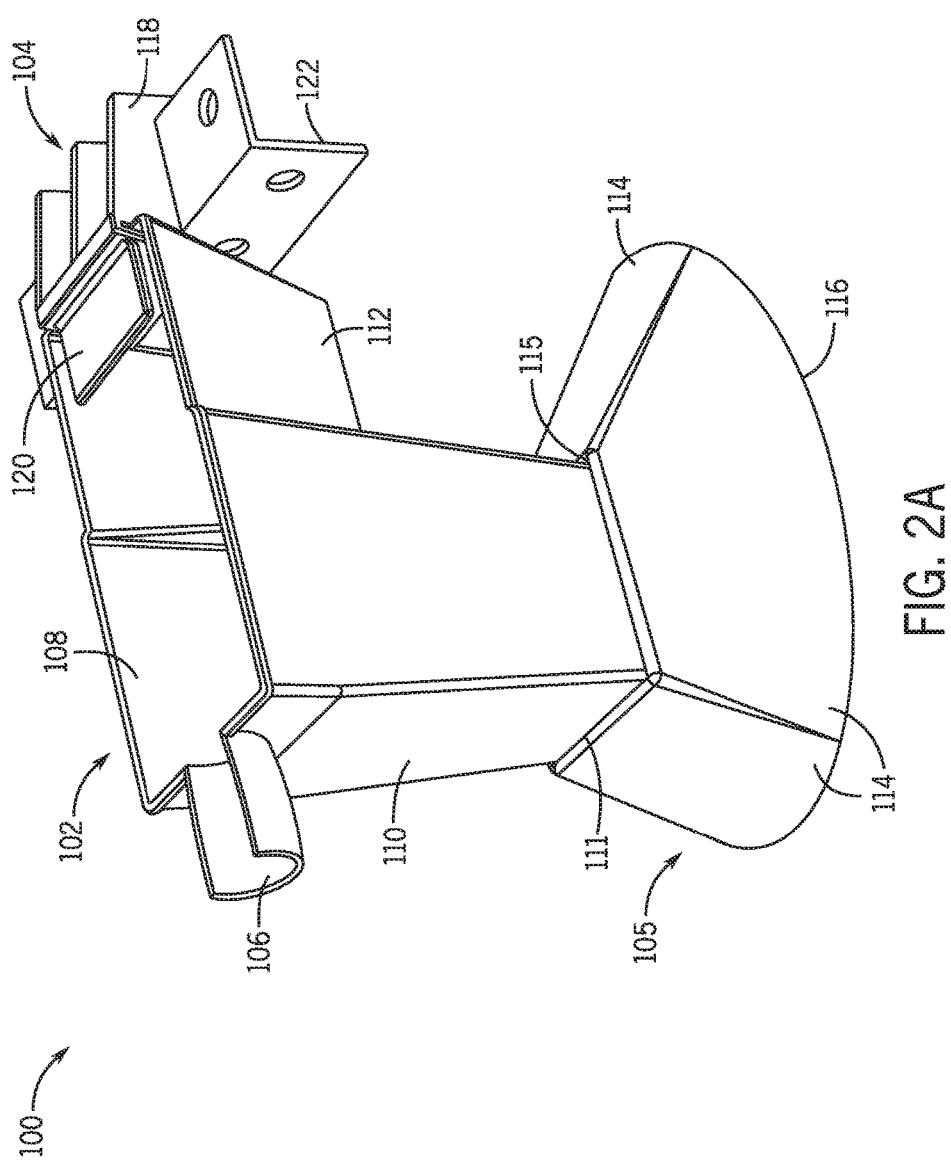
FIG. 2A is a perspective view of an example oil catch bucket in accordance with the present invention.

FIG. 2A is an example oil catch bucket 100 in accordance with the present invention. As shown in FIG. 2A, the oil catch bucket 100 includes a pail 102, a hanger arm 104, and a base 105. Pail 102, hanger arm 104, and base 105 can each be detached from one another, so as to reduce space consumed when storing and/or shipping the oil catch bucket 100.

Pail 102 includes a clip 106, a reservoir 108, a main body 110, and an extended body 112. Hanger arm 104 includes gripping sections 118, and a roof 120. Base 105 includes surfaces 114, a receiving section 115, and a bottom 116.

Figure 2B:
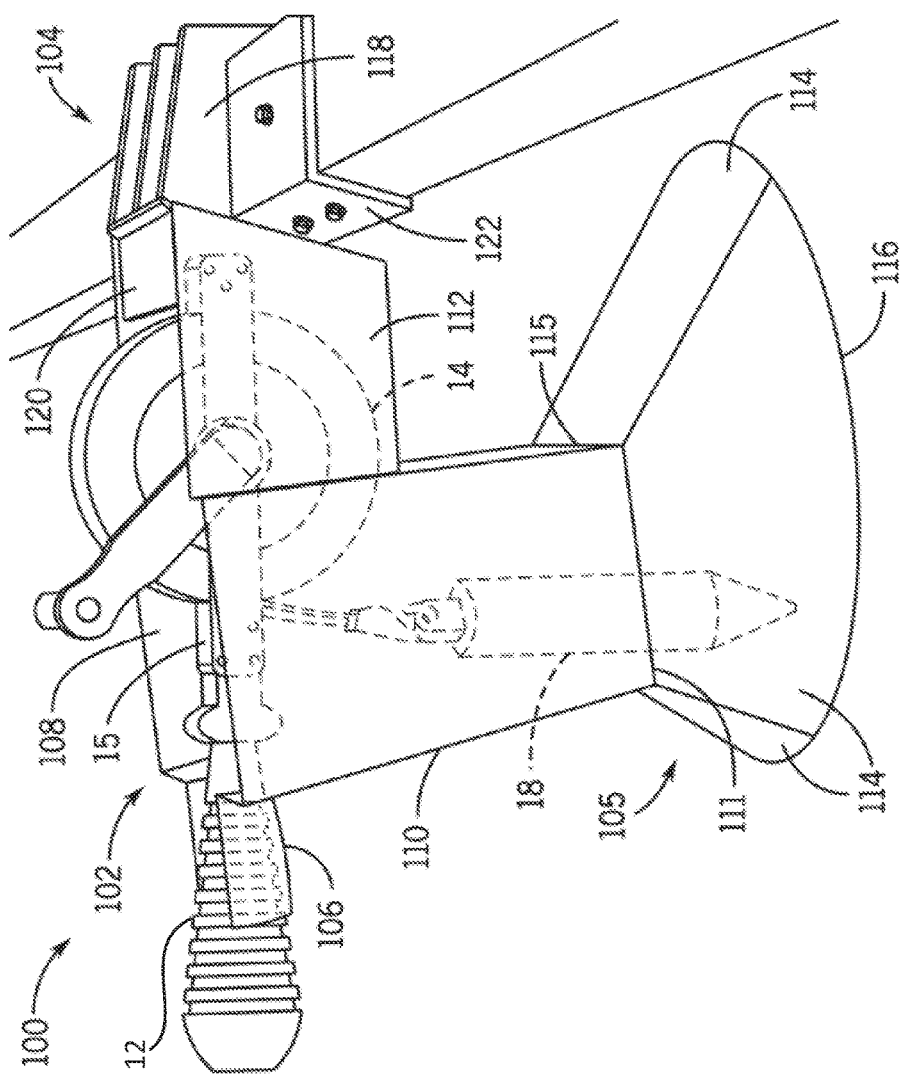
FIG. 2B is a perspective view of the example oil catch bucket of FIG. 2A holding the gauge tool of FIG. 1.

Referring to FIG. 2B, oil catch bucket 100 is used to capture oil that drips from a gauge tool (e.g., gauge tool 10) after use. For example, after gauge tool 10 has been used, a worker can securely attach gauge tool 10 to oil catch bucket 100 by clipping handle 12 to clip 106, such that tape from the tape reel 14 is wound up and mostly within extended body 112, and plumb bob 18 is within main body 110. The worker can then carry away gauge tool 10, along with oil catch bucket 100 via handle 12. Any oil that drips from gauge tool 10 is entirely captured within pail 102, and therefore does not drip in the work area in which gauge tool 10 is used, or on structures in, around, or leading up to the work area (e.g., stairs, ramps, angle irons, railings, ladders, etc.). This protects the environment from repeated drippings of oil, which can add up substantially over time, creating an environmental hazard. Additional details regarding the usage of oil catch bucket 100 are described in greater detail below.

As previously described, pail 102 includes clip 106. Clip 106 is used to secure a handle 12 of gauge tool 10 in place. Clip 106 can be made from a malleable plastic that provides an inward biasing force when the handle 12 forces clip 106 outward (e.g., when a worker clips handle 12 into clip 106). When there is no handle 12 held by clip 106, clip 106 can also serve as a spout to pour oil out of reservoir 108 into another container, such as a container at a designated oil disposal and/or recycling facility.

Pail 102 further includes main body 110 and extended body 112. Main body 110 extends downwardly and has dimensions such that the entirety of plumb bob 18 can be placed within reservoir 108 when gauge tool 10 is clipped to clip 106. Main body 110 may be tapered, and can be attachably inserted into base 105 through a receiving section 115 of base 105. For example, a bottom portion 111 of main body 110 can have a shape and dimensions corresponding to the shape and dimensions of receiving section 115. Extended body 112 extends horizontally, and has dimensions such that the tape reel 14 can be placed in reservoir 108 when gauge tool 10 is clipped to clip 106. FIGS. 3A-3D show additional views of just pail 102 from various viewpoints.

Hanger arm 104 includes multiple gripping sections 118 that grip an angle iron 122. For example, each gripping sections 118 includes a hook that grips angle iron 122 (as later described with respect to FIGS. 4A and 4B). Angle iron 122 can be, for example, part of a railing or handle around an oil tank. Hanger arm 104 can grip angle iron 122 at a location relatively close to an opening of an oil tank, so that a worker can quickly and easily clip a gauge tool 10 to oil catch bucket 100 to catch oil that drips from the gauge tool 10. Hanger arm 104 also includes roof 120.

Figure 6B:
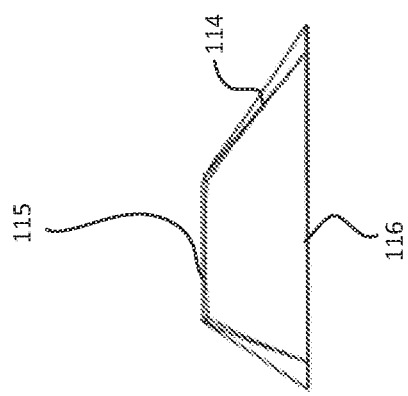
FIG. 6B is a side view of the base portion of FIG. 6A of the oil catch bucket.
Figure 6A:
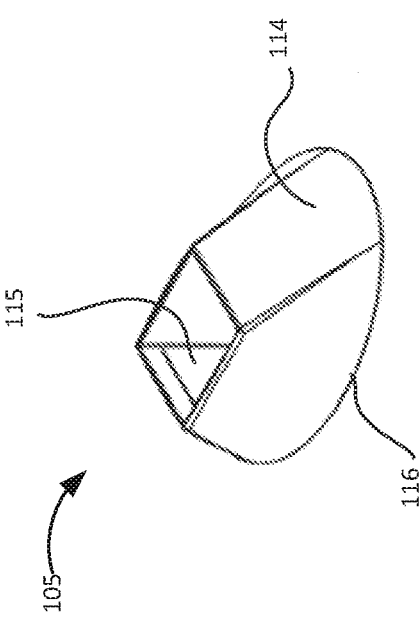
FIG. 6A is a perspective view of a base portion of the oil catch bucket.

Base 105 can be used to set oil catch bucket 100 on a surface near an opening of the oil tank so that a worker can use oil catch bucket 100 to catch oil that drips from the gauge tool 10. The worker can hold base 105 down at surfaces 114 so that oil catch bucket 100 does not move, and so that handle 12 can be clipped to clip 106. As described below, oil catch bucket 100 can either be hung from angle iron 122 via hanger arm 104, or set on a surface via base 105. Additional views of base 105 are shown in FIGS. 6A and 6B.

Referring again to FIG. 2B, when handle 12 of oil gauge 10 securely clips into clip 106 of pail 102. When attached to oil catch bucket 100, a distal end of tape frame 15 of oil gauge 10 can abut against roof 120, to better hold oil gauge 10 in place.

Figure 2D:
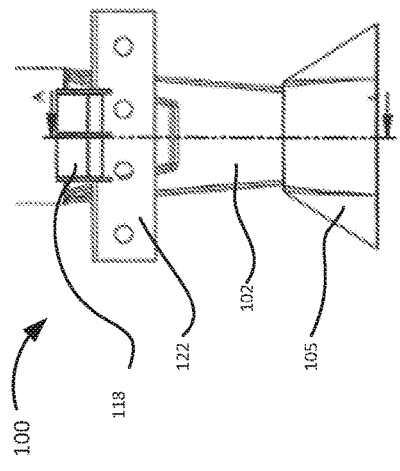
FIG. 2D is a front view of the example oil catch bucket of FIG. 2A.
Figure 2E:
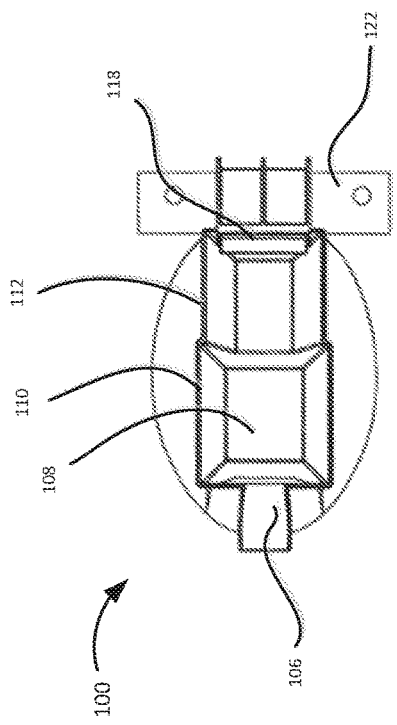
FIG. 2E is a top view of the example oil catch bucket of FIG. 2A.
Figure 2C:
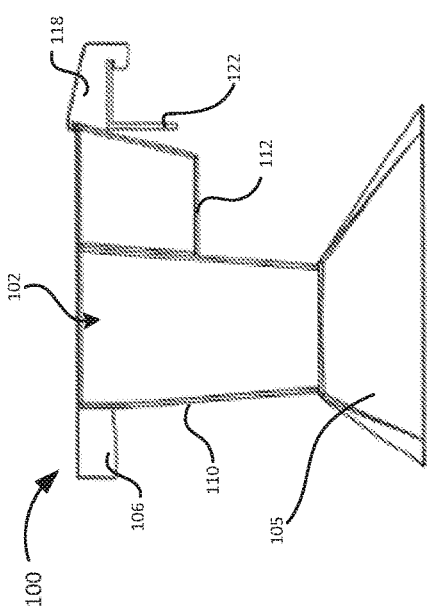
FIG. 2C is a side view of the example oil catch bucket of FIG. 2A.

FIGS. 2C-2E provide views of oil catch bucket 100 from various viewpoints. For example, FIG. 2C is a side view of oil catch bucket 100, FIG. 2D is a front view of oil catch bucket 100, and FIG. 2E is a top view of oil catch bucket 100.

Figure 3B:
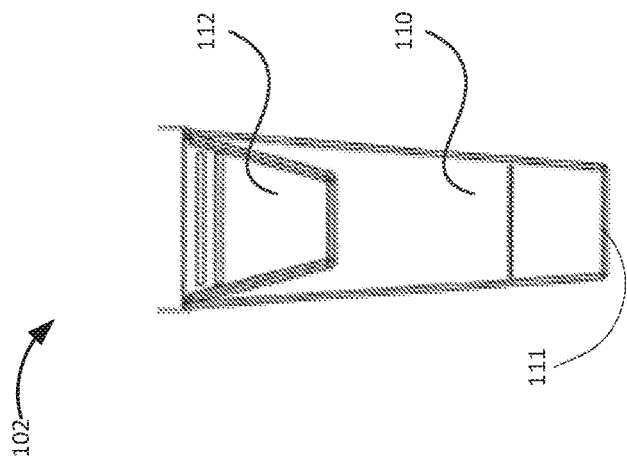
FIG. 3B is a front view of a pail of the oil catch bucket of FIG. 2A.
Figure 3A:
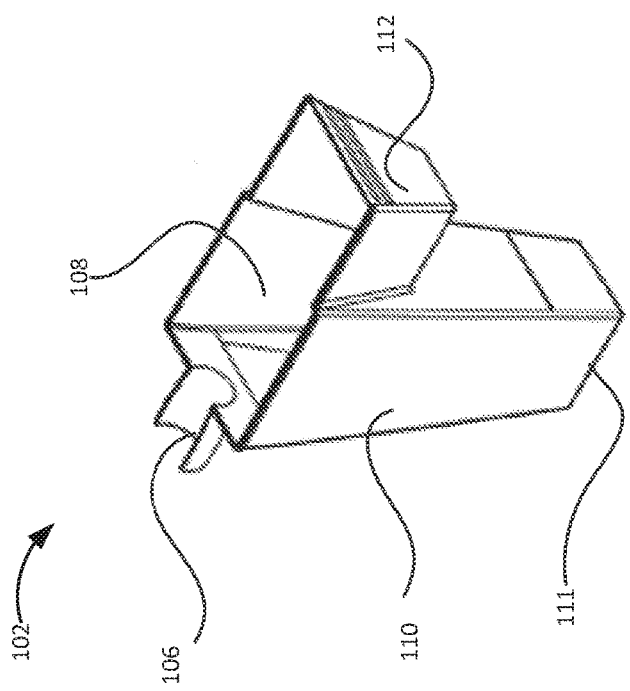
FIG. 3A is a perspective view of a pail of the oil catch bucket of FIG. 2A.
Figure 3D:
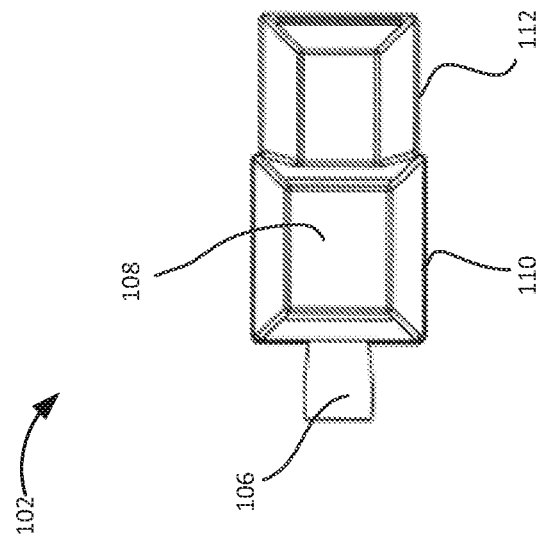
FIG. 3D is a top view of a pail of the oil catch bucket of FIG. 2A.
Figure 3C:
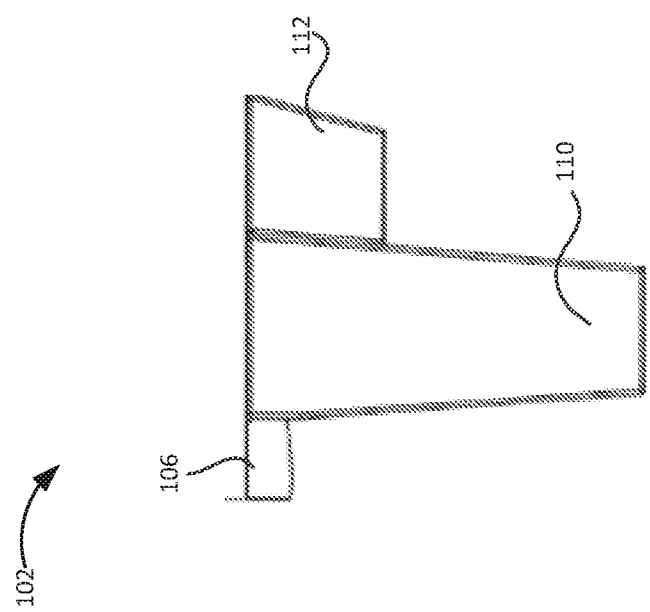
FIG. 3C is a side view of a pail of the oil catch bucket of FIG. 2A.

FIGS. 3A-3D show the pail 102 from various viewpoints. For example, FIG. 3A provides a perspective view, FIG. 3B shows a front view, FIG. 3C shows a side view, and FIG. 3D is a top view of pail 102.

FIGS. 4A and 4B are views of hanger arm 104 at various angles. For example, FIG. 4A is a perspective view of hanger arm 104, and FIG. 4B is a side view of hanger arm 104. As shown in FIGS. 4A and 4B, hanger arm 104 includes a stabilizer 124, and a slot 119. The slot 119 includes locking tabs 126. Hanger arm 104 can be attached to pail 102 (e.g., at extended body 112) via stabilizer 124, slot 119, and locking tabs 126.

Figure 5:
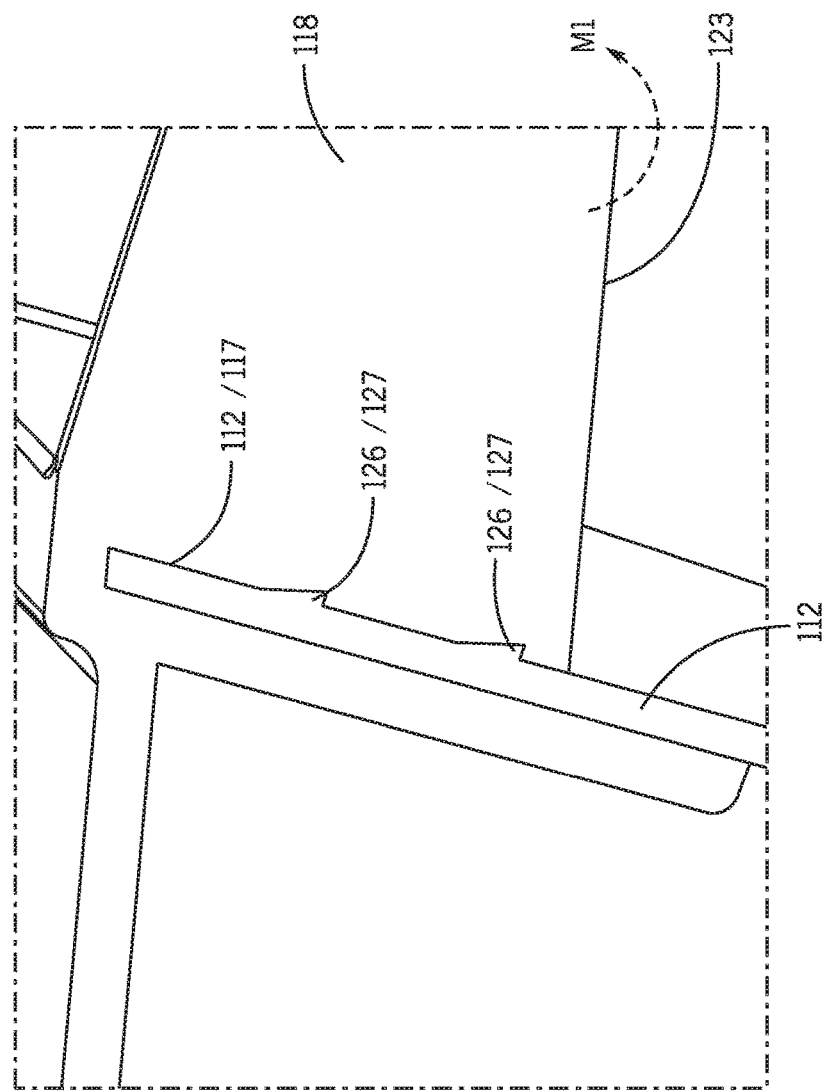
FIG. 5 is a close up of the hanger arm of FIG. 4B connected to the pail of FIG. 3A of the oil catch bucket.

For example, referring to FIG. 5, an end of extended body 112 can include protrusions 127 that are cooperatively sized with locking tabs 126 of the hanger arm 104. The end of extended body 112 is partially placed within slot 119, and hanger arm 104 is rotated approximately in the in the direction of M1 to create space for protrusions 127 to fit in to locking tabs 126. When rotated, stabilizer 124 presses against 112, and allows the space to be created (e.g., by effectively increasing the size of slot 119). As hanger arm 104 is rotated, hanger arm 104 is then slide down so that extended body 112 is completely within slot 119. Hanger arm 104 is then released, and returns to its original position. When hanger arm 104 is returned to its original position, locking tabs 126 captures protrusions 127, thereby locking hanger arm 104 to extended body 112.

Returning to FIGS. 4A and 4B, each gripping section 118 includes a hook 117 used to hang hanger arm 104 to angle iron 122. Hook 117 can capture angle iron 122 by placing a bottom surface 123 of gripping sections 118 on top of angle iron 122, sliding hanger arm 104 away from angle iron 122, and then sliding hanger arm 104 towards angle iron 122, thereby engaging hook 117 with angle iron 122.

FIGS. 6A and 6B are views of base 105 at various angles. For example, FIG. 6A is a perspective view of base 105, and FIG. 6B is a side view of base 105. As shown, in FIGS. 6A and 6B, base 105 includes side surfaces 114, receiving section 115, and a bottom surface 116. Receiving section 115 can be substantially square-shaped, and can receive bottom portion 111 of pail 102, to attach pail 102 to base 105. The dimensions of receiving section 115 are slightly smaller than the dimensions of bottom portion 111. Base 105 can be made from a malleable material, so that receiving section 115 can expand when bottom portion 111 is inserted into base 105, and grip bottom portion 111 once inserted.

With reference to FIG. 2B, to use oil catch bucket 100, oil catch bucket 100 is hung from angle iron 122 via hanger arm 104, or set on a surface via base 105. Oil catch bucket 100 can be hung or set down in an area relatively close to an opening of an oil tank, where a gauge tool (e.g., gauge tool 10) is used to gauge the oil level in the tank (e.g., so that oil catch bucket 100 can be used to capture oil dripped from gauge tool 10 after use). For example, oil catch bucket 100 can be hung from an angle iron 122 (e.g., via hanger arm 104, as described above with respect to FIGS. 4A and 4B). Oil catch bucket 100 can be hung from angle iron 122, for example, next to the opening of the oil tank. Alternatively, oil catch bucket 100 can be set on a surface next to the opening of the oil tank.

After a worker has rewound tape 14 and removed gauge tool 10 from the opening of the oil tank, the worker can securely clip handle 12 to clip 106 such that a spooled portion of tape 14 rests within extended body 112, and plumb bob 18 rests within main body 110 (e.g., as shown in FIG. 2B). If oil catch bucket 100 is set on a surface, the worker can hold base 105 down at surfaces 114 so that oil catch bucket 100 does not move, and so that handle 12 can be clipped to clip 106. If oil catch bucket 100 is hung on angle iron 122, the worker may not need to hold down base 105 (and in fact, base 105 may not even need to be attached to pail 102 when oil catch bucket 100 is hung to angle iron 122).

Once gauge tool 10 is securely attached to oil catch bucket 100, the worker can then carry away (e.g., from a work area) gauge tool 10 along with oil catch bucket 100 (e.g., since gauge tool 10 is clipped in to oil catch bucket 100 via clip 106). For example, the worker can carry gauge tool 10 and oil catch bucket 100 using handle 12.

As can be seen, pail 102 is shaped such that any oil that may drip from gauge tool 10 is completely captured within pail 102. For example, the extended body 112 of pail 102 extends horizontally so that the entirety of spool of gauge tool 10 can be placed within pail 102, and main body 110 extends vertically so that the entirety of plumb bob 18 can be placed within pail 102. Further, clip 106 maintains gauge tool 10 in a position that keeps plumb bob 18 hanging vertically so that as much oil as possible can drip from plumb bob 18 into pail 102. As a result, any oil that drips from gauge tool 10 is completely captured by oil catch bucket 100. Also, gauge tool 10 can be carried away while clipped into oil catch bucket 100. For example, a worker can carry gauge tool 10 from the handle 12 while handle 12 is clipped into clip 106. As such, any oil that drips from gauge tool 10 is completely captured by oil catch bucket 100 as gauge tool 10 is carried away. Thus, the oil does not drip in a work area, and does not drip on structures such as oil tanks, angle irons, railings, floors, ramps, stairs, ladders, etc. around or leading up to the work area. As a result, worker safety conditions are improved, and the environmental impacts of spilled oil are reduced.

It is to be understood that the invention is not limited to the specific sizes, shapes, or applications shown or described.

It is to be understood that the disclosure in this specification includes all possible combinations of such particular features, regardless of whether a combination is explicitly described. For example, where a particular feature is disclosed in the context of a particular aspect or embodiment of the invention, that feature can also be used, to the extent possible, in combination with and/or in the context of other particular aspects and embodiments of the invention, and in the invention generally.

Other modifications and implementations will occur to those skilled in the art without departing from the spirit and the scope of the invention as claimed. Accordingly, the above description is not intended to limit the invention, except as indicated in the following claims.

What is claimed is:

1. Apparatus for catching and accumulating oil drips associated with use of an oil level gauge tool, the oil level gauge tool having a handle, a tape, a tape reel having a winding handle for winding the tape onto the tape reel, a tape frame for supporting the tape reel, and a plumb bob attached at an end of the tape, the apparatus comprising:
- a handle receiving portion capable of receiving and securing the handle of the oil level gauge tool;
- a plumb bob receiving portion capable of receiving the plumb bob, also capable of catching and accumulating oil drips from the oil level gauge tool; and
- a tape reel receiving portion capable of receiving the tape reel, also capable of catching oil drips from the oil level gauge tool.

2. The apparatus of claim 1, further including a hanger arm, attached to the tape reel receiving portion, the hanger arm being capable of attaching to a structure so as to support the apparatus.

3. The apparatus of claim 2, wherein the hanger arm includes a slot, and is attached to the tape reel receiving portion via the slot.

4. The apparatus of claim 2, wherein the hanger arm is configured so as to attach to an angle iron.

5. The apparatus of claim 1, further including a base, attached to the plumb bob receiving portion, the base being capable of resting on a surface so as to stabilize the apparatus.

6. The apparatus of claim 1, wherein the plumb bob receiving portion and the tape reel receiving portion are in fluid communication, such that oil collected in the tape reel receiving portion can flow to and be collected in the plumb bob receiving portion.

7. The apparatus of claim 1, wherein the handle receiving portion is in fluid communication with the plumb bob receiving portion, such that oil collected in the plumb bob receiving portion can controllably flow out from the apparatus when there is not a handle in the handle receiving portion, and the apparatus is tilted.

8. The apparatus of claim 3, wherein the base is sized and shaped so as to be broader than the bottom of the plumb bob receiving portion, and to extend under the tape reel receiving portion.

9. Apparatus for catching and accumulating oil drips associated with use of an oil level gauge tool, the oil level gauge tool having a handle, a tape, a tape reel having a winding handle for winding the tape onto the tape reel, a tape frame for supporting the tape reel, and a plumb bob attached at an end of the tape, the apparatus comprising:
- a handle receiving portion capable of receiving and securing the handle of the oil level gauge tool;
- a plumb bob receiving portion capable of receiving the plumb bob, also capable of catching and accumulating oil drips from the oil level gauge tool;
- a tape reel receiving portion capable of receiving the tape reel, also capable of catching oil drips from the oil level gauge tool;
- a hanger arm, extending from the tape reel receiving portion, the hanger arm being capable of attaching to a structure so as to support the apparatus; and
- a base, integral with the bottom of the plumb bob receiving portion, the base being capable of resting on a surface so as to support the apparatus.

10. The apparatus of claim 9, wherein the plumb bob receiving portion and the tape reel receiving portion are in fluid communication, such that oil collected in the tape reel receiving portion can flow to and be collected in the plumb bob receiving portion.

11. The apparatus of claim 9, wherein the handle receiving portion is in fluid communication with the plumb bob receiving portion, such that oil collected in the plumb bob receiving portion can controllably flow out from the apparatus when there is not a handle in the handle receiving portion, and the apparatus is tilted.

12. The apparatus of claim 9, wherein the hanger arm is configured so as to attach to an angle iron.

13. The apparatus of claim 9, wherein the base is sized and shaped so as to be broader than the bottom of the plumb bob receiving portion, and to extend under the tape reel receiving portion.

14. Apparatus for catching and accumulating oil drips associated with use of an oil level gauge tool, the oil level gauge tool having a handle, a tape, a tape reel having a winding handle for winding the tape onto the tape reel, a tape frame for supporting the tape reel, and a plumb bob attached at an end of the tape, the apparatus comprising:
- a handle receiving portion capable of receiving and securing the handle of the oil level gauge tool;
- a plumb bob receiving portion capable of receiving the plumb bob, also capable of catching and accumulating oil drips from the oil level gauge tool; and
- a tape reel receiving portion capable of receiving the tape reel, also capable of catching oil drips from the oil level gauge tool,
- wherein the plumb bob receiving portion and the tape reel receiving portion are in fluid communication, such that oil collected in the tape reel receiving portion can flow to and be collected in the plumb bob receiving portion, and
- wherein the handle receiving portion is in fluid communication with the plumb bob receiving portion, such that oil collected in the plumb bob receiving portion can controllably flow out from the apparatus when there is not a handle in the handle receiving portion, and the apparatus is tilted.

15. The apparatus of claim 14, further including a hanger arm, attached to the tape reel receiving portion, the hanger arm being capable of attaching to a structure so as to support the apparatus.

16. The apparatus of claim 15, wherein the hanger arm includes a slot, and is attached to the tape reel receiving portion via the slot.

17. The apparatus of claim 15, wherein the hanger arm is configured so as to attach to an angle iron.

18. The apparatus of claim 14, further including a base, attached to the plumb bob receiving portion, the base being capable of resting on a surface so as to support the apparatus.

19. The apparatus of claim 18, wherein the base is sized and shaped so as to be broader than the bottom of the plumb bob receiving portion, and to extend under the tape reel receiving portion.

20. The apparatus of claim 18, wherein the base is removable.

* * * * *